Figure 1:
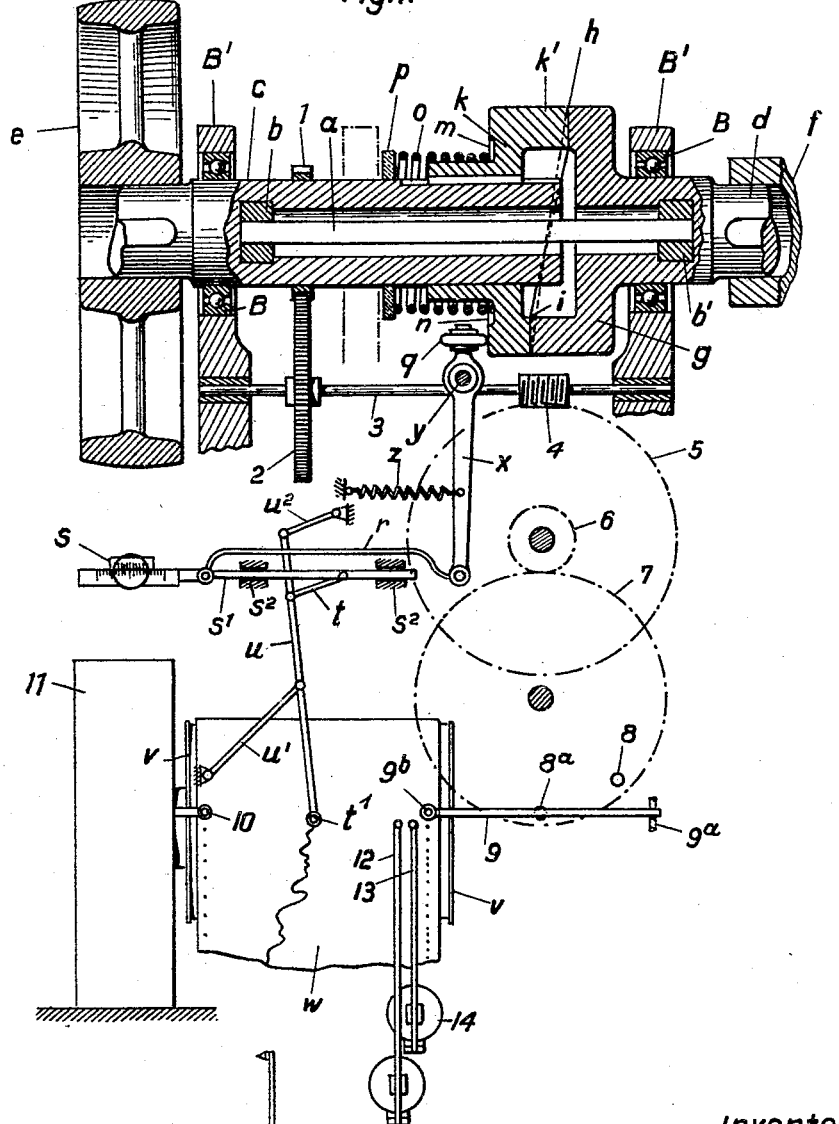

Aug. 11, 1931.  M. KURREIN  1,817,922

OUTPUT METER FOR WORKING CONTROL

Filed March 26, 1925

Inventor:
Max Kurrein
By [signature]
Attorney.

Patented Aug. 11, 1931

1,817,922

UNITED STATES PATENT OFFICE

MAX KURREIN, OF CHARLOTTENBURG, GERMANY

OUTPUT METER FOR WORKING CONTROL

Application filed March 26, 1925, Serial No. 18,536, and in Germany March 29, 1924.

My invention relates to an output meter for use in connection with machines converting power into work; more especially, said output meter is intended to register and indicate automatically and continually the amount of power taken up, and all data necessary for the usual investigations concerning the time consumed.

The invention is based upon a principle or idea which could not possibly be carried into practice hitherto in connection with working control, viz. upon a solution of the problem to ascertain in every moment the true performance (in kgm., horse-power, kilowatt, and the like) rendered by the respective machine, as well as the variations of that performance, and to use the data obtained as basis for the working-control, and for ascertaining the respective data employed for the indirect working-control, such as total and partial working-period, periods of running without load, number of pieces treated, and the like. It is now rendered possible to reduce these data to one magnitude of comparison which is of the same order as the power conducted into the machine, and the necessity is obviated to have recourse to such statements as kg. of chips per hour, or number of holes per hour, or the like.

The problem mentioned can be discerned in the intense endeavours to find out, and stick to, so-called, constants of material as used, for instance, for reducing or converting the production of chips to kgm., and the like, but solving that problem and carrying the solution into practice was prevented up to now by the impossibility of coupling the existing output meters easily and correctly, as regards the measurements in view, with any kind or type of machines, another fact being this that all devices intended for working-control and existing in commerce are nothing elese but devices for measuring time or movements.

My new apparatus is a torsion-dynamometer (Föttinger, Amsler, and others) in which the shape of the measuring spring is of no importance whatever,—in fact, in certain cases even hollow cylinders may be used advantageously as measuring springs,—but important and essential is the manner of transmitting the indications of the respective measuring spring to an indicating and registering or recording apparatus indicating and registering or recording all magnitudes or data connected with the periods of working and of handling or manipulating the workpieces.

In contradistinction to all existing types of torsions-dynamometers the measurements are effected, with the present improved device, by a rotating measuring member, whereas the indications and the registrations take place by a stationary member; the transmission is effected automatically and continually while the respective machine is in operation, and does not affect the accuracy of the indications and registrations.

My invention is illustrated diagrammatically and by way of example in

Fig. 1 of the accompanying drawings in which the upper parts are shown in axial section and the lower parts in side view, some transmission wheels being indicated merely by dotted lines.

Figure 2:
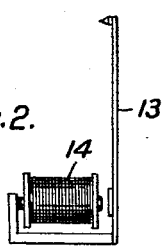

Fig. 2 shows some details.

The apparatus according to this invention indicates and records automatically and in relation to each other:

(1) The horse power consumed in machining a piece of work (by a marking pencil $t$).

(2) The time taken for machining the said piece (by a writing device 10 and clockwork 11).

(3) The number of revolutions of the work spindle equivalent to the cutting speed (by a gearing 5—8 and marking pin 9).

(4) The number of finished pieces, which is found from the number of repeated diagrams (written by the pencil $t'$).

(5) The quality of these pieces, found from the form of the said diagrams.

(6) The times of working periods, resting periods and preparation periods for finishing one piece of work, found from the relation between pin marks 12, 13 etc. and the simultaneously written horse power diagram (pencil $t'$).

In the complete record the horse power diagram forms the base, in relation to which all other marks are read.

On the drawing $a$ denotes the measuring spring which is cylindrical in this instance and is supported in and between the telescopically disposed shafts $c$ and $d$ of the dynamometer by separate inserted members $b$ and $b'$. The cylindrical spring $a$ is subjected to torsional stress exactly proportionally to the driving moment as soon as a moment of torsion, or turning moment respectively, is transmitted from the pulley $e$ to the coupling $f$ by which the apparatus is coupled with a shaft of the machine to be investigated. In other words, the dynamometer is directly inserted between the machine to be investigated and is drive, the latter being a pulley driven by a transmission shaft or an electromotor or the like.

The shaft $c$ is turned for a certain angle relatively to the shaft $d$, and this turning of these shafts relatively to one another is used also in the present improved torsion-dynamometer, as with the known ones, for measuring the performance.

The lefthand end of the spring $a$ is connected firmly with the shaft $c$ by the inserted member $b$, and the righthand end of the spring $a$ is connected firmly with the shaft $d$ by the inserted member $b'$. The lefthand end of the shaft $d$ is provided with a flange-like enlargement or head $g$ presenting on its left side an oblique surface $h$—$i$ forming either a simple or a symmetrical screw-thread or, more precisely, a part of such a one. Opposite said enlargement or head $g$ a sleeve $k$ having an enlargement or head $k'$ like the head $g$ which is so shaped as to contact with the oblique surface $h$—$i$ of the enlargement or head $g$ is arranged upon the shaft $c$. The sleeve $k$ is shiftable but not rotatable upon the shaft $c$, that is it is connected with the shaft $c$ by feather and groove and is carried upon this shaft in such a manner that the friction between these two parts is the smallest possible. The shafts $c$ and $d$ are journalled, by means of ball bearings B in brackets B' forming a part of the frame of the apparatus.

Now, when a turning moment arises by the transmission from the shaft $c$ to the shaft $d$ by the intermediary of the spring $a$, the ends of this latter are being turned relatively to one another, as do also the heads $g$ and $k'$ thereby shifting the sleeve $k$ to the lefthand side.

The lefthand face $m$ of the head $k$ is located at right angles with respect to the axis of the telescopically arranged parts $c$, $d$, and contacts with a roll $q$ attached to the short upper arm of a double-armed lever $x$ supported on a pivot $y$ fixed on the frame of the apparatus and subjected to the pull of a spring $z$ by which the roll $q$ is kept continually in contact with the face $m$. The two oblique faces $h$—$i$ (one pertaining to the head $g$, the other to the head $k'$) are pressed against one another by a helical spring $o$ encompassing the sleeve and bearing at one end against the sleeve and at the other end against an adjustable ring $p$ by means of which the pressure which the spring $o$ exerts upon the sleeve can be regulated.

The motion of the longer arm of the lever $x$ is transmitted by a rod $r$ jointed to the lower end of the lever $x$ to an indicator or a measuring device $s$ for ocular inspection and being of any desired type. The rod $r$ is pivoted to the slide $s'$ of said measuring device, guided in fixed guides $s^2$. The movement of the slide $s^1$ is transmitted by a pivoted link $t$ to a rod $u$ guided by two links $u^1$ and $u^2$ and bearing the writing pin $t^1$ of a registering or recording device. The transmission of the movement may however also be effected by means of any other suitable so-called "kinematic chain".

The writing pin $t^1$ records its movements upon a paper strip $w$ guided on a drum $v$. The drum is rotated in the usual manner by a wheel work 11 indicated on the drawings by its casing.

As the output-diagram of a working machine must show quite distinctly every motion pertaining to that machine, especially the most important phases such as periods of working with and without load, incomplete working phases, time used for adjustments and for other manipulations, and the like, I have conceived the idea of combining the output-diagram with registrations of the speeds and the times in order to render possible to solve the thus obtained combination-diagram and utilize it for the purpose of calculation.

For that purpose the apparatus shown by way of example in the drawings is provided with certain additional transmission means which, in the example illustrated, consist of a train of members, viz. a cog-wheel 1 secured to the shaft $c$, another cog-wheel 2 meshing with said wheel 1, a shaft 3 to which is affixed said wheel 2 and a worm 4, a worm-wheel 5 meshing with said worm and connected with a considerably smaller cog-wheel 6, a large cog-wheel 7 meshing with said small wheel 6 and connected with another large cog-wheel 7 which is provided with a projection 8 co-operating with a projection $8^a$ pertaining to a flat spring 9 or the like secured at $9^a$ to any stationary member and provided at its free end with a marking or writing pin $9^b$ producing marks upon the strip of paper $w$. The ratio of transmission may be such that the pin $9^b$ produces a mark on the paper $w$ after each 500 revolutions of the shaft $c$. The wheel-work 11 also actuates periodically a marking or writing pin 10 in any desired manner, the marks of which indicate seconds or a multiple thereof. Further marking levers or arms with marking or writing pins can be provided, as, the two marking levers or arms 12 and 13, which are actuated by stops or the like engaging certain moved parts of the respective machine in their end positions either mechanically or electrically. These other marking arms (12, 13, and, may be, another one or other ones) indicate the time consumed for manipulations and the like. If the actuation is an electrical one, the said stops may, when engaging the respective moved part of the machine close an electrical circuit thereby energizing electro-magnets 14 attracting the arms 12 and 13 (Fig. 2).

It results from the above description of the device that it rendered possible thereby to learn by and from it the various performances caused by or connected with any work, as, working-time proper, time for preparations, and the like, and from the diagram obtained can also be ascertained whether the work has been done in the prescribed stages or phases, there being no necessity to influence the respective workman in any way, or to be present at the respective machine. The diagram obtained can be valued perfectly non-influenced or unprejudiced, and can be utilized for the control of the working and for calculating purposes, as the number of the working pieces is indicated at all events by the curve of performance irrespective of the times of running without load etc. which prevent, with the known devices, reliable reading of the diagram and render the statements incorrect.

If the apparatus is to be shoved upon a work-piece, as will be requisite, when it is employed in connection with a grinding machine, a hollow measuring spring must be used instead of a solid one.

The apparatus may be permanently connected with a machine or may be interchangeable.

I claim:

1. A torsional dynamometer for measuring and indicating the work and performance of machines, comprising a driving shaft; a driven shaft connected with the machine to be measured; a measuring torsion spring arranged concentrically to and connected at its ends with said shafts respectively; two members mounted on and adapted to be rotated by the two shafts respectively and being axially movable relatively to each other independently of said shafts; helical surfaces on said members adapted to move them apart when angularly moved against each other; means for pressing said members against each other; and means cooperating with said members for recording their axial movement.

2. A torsional dynamometer for measuring and indicating the work and performance of machines, comprising a driving shaft; a driven shaft connected with the machine to be measured; a measuring torsion spring arranged concentrically to and connected at its ends with said shafts respectively; two members mounted on and adapted to be rotated by the two shafts respectively and being axially movable relatively to each other independently of said shafts; helical surfaces on said members adapted to move them apart when angularly moved against each other; means for pressing said members against each other; and means cooperating with said members for recording their axial movement, said helical surfaces being symmetrically arranged to transfer an axial motion in the same direction independent of the angular movement from their initial position in a clockwise or counter-clockwise directon.

3. A torsional dynamometer for measuring and indicating the work and performance of machines, comprising a driving shaft; a driven shaft connected with the machine to be measured; a measuring torsion spring arranged concentrically to and connected at its ends with said shafts respectively; two members mounted on and adapted to be rotated by the two shafts respectively and being axially movable relatively to each other independently of said shafts; helical surfaces on said members adapted to move them apart when angularly moved against each other; means for pressing said members against each other; means cooperating with said members for recording their axial movement; a lever transmitting the motion to be recorded from said members to said recording means arranged on said means and only touching the members; and means separated from the said machine and serving for supporting said recording means.

In testimony whereof I have affixed my signature.

MAX KURREIN.